(12) United States Patent
Zhang et al.

(10) Patent No.: US 9,700,972 B2
(45) Date of Patent: Jul. 11, 2017

(54) PRESSING DEVICE

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Xiang-Tao Zhang, Jiashan (CN); Qiang-Wei Wang, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 620 days.

(21) Appl. No.: 14/205,548

(22) Filed: Mar. 12, 2014

(65) Prior Publication Data

US 2014/0259587 A1    Sep. 18, 2014

(30) Foreign Application Priority Data

Mar. 18, 2013   (CN) .................... 2013 2 0121107 U

(51) Int. Cl.
*B23P 19/04* (2006.01)
*H04B 1/3888* (2015.01)
(Continued)

(52) U.S. Cl.
CPC ......... *B23P 19/04* (2013.01); *A45C 2011/002* (2013.01); *B25B 11/02* (2013.01);
(Continued)

(58) Field of Classification Search
CPC .. B30B 9/00; B30B 1/106; B30B 1/14; B30B 1/16; B30B 1/02; B30B 1/006;
(Continued)

(56) References Cited

U.S. PATENT DOCUMENTS 2,269,389 A * 1/1942 Weida ....................... B30B 1/16
                                                         100/271
2,755,595 A * 7/1956 Meyer .................... B68G 15/00
                                                         254/248
(Continued)

FOREIGN PATENT DOCUMENTS

CA       2793820       * 10/2010
DE       3402315       * 7/1984
(Continued)

OTHER PUBLICATIONS

SolidWorks Pinion Rack Mechanism, YouTube at: https://www.youtube.com/watch?v=Oupme_s5uZg; Publication Date: Apr. 30, 2012.*

(Continued)

*Primary Examiner* — Larry E Waggle, Jr.
*Assistant Examiner* — Mahdi H Nejad
(74) *Attorney, Agent, or Firm* — Steven Reiss

(57) ABSTRACT

A pressing device employed to press protection blocks to a workpiece, includes a seat, a transmission assembly and four pressing assemblies. The transmission assembly includes a connecting rod, a rotation shaft, a gear, and a transmission member. The connecting rod is pivotally connected to a bottom of the seat and forms racks on one end. The rotation shaft is assembled to a side of the seat away from the pivoting rod. The gear is securely sleeved on the rotation shaft and engages with the racks. The transmission member is securely sleeved on the rotations shaft. Each pressing assembly is connected to the transmission member of the transmission assembly, and when the connecting rod drives the rotation shaft, and the rotation shaft moves the pressing assembly toward the seat, the protection block is then pressed to the workpiece.

18 Claims, 4 Drawing Sheets

(51) Int. Cl.
  *A45C 11/00* (2006.01)
  *H04M 1/18* (2006.01)
  *B25B 11/02* (2006.01)

(52) U.S. Cl.
  CPC ........... *H04B 1/3888* (2013.01); *H04M 1/185* (2013.01); *Y10T 29/5397* (2015.01)

(58) Field of Classification Search
  CPC ............... B23P 19/04; Y10T 29/53961; Y10T 29/5397; Y10T 29/53026; H04B 1/3888; H04B 1/388; H04M 1/185; A45C 2011/002; B25B 11/02; B25B 5/142
  USPC ............... 29/281.1, 281.3, 893.34, 894.353, 29/898.045, 238; 74/521; 249/162; 269/37, 202, 210, 227; 248/346.06; 100/262, 288, 286, 284, 283, 281, 282, 100/280, 277, 276, 275, 285, 294, 302, 100/324, 137, 143, 161, 193, 243, 244, 100/269.03
  See application file for complete search history.

(56) References Cited

U.S. PATENT DOCUMENTS

| | | | | |
|---|---|---|---|---|
| 3,350,065 | A * | 10/1967 | Mankey | B66F 3/22 187/269 |
| 3,682,029 | A * | 8/1972 | Haas | B23D 15/14 83/554 |
| 3,781,159 | A * | 12/1973 | Lidl | B29C 45/68 100/264 |
| 4,168,825 | A * | 9/1979 | Primmer | B25B 5/142 269/112 |
| 5,290,006 | A * | 3/1994 | Gouker | E02D 29/12 249/146 |
| 6,539,600 | B2 * | 4/2003 | Wu | B23P 19/02 269/234 |
| 2004/0200298 | A1 * | 10/2004 | Voelkert | F16D 27/06 74/22 R |
| 2007/0137343 | A1 * | 6/2007 | Roeske | B21J 5/12 74/424.6 |
| 2008/0079849 | A1 * | 4/2008 | Inaba | H04N 5/2253 348/374 |
| 2008/0196521 | A1 * | 8/2008 | Chiang | H02K 41/02 74/20 |
| 2009/0165247 | A1 * | 7/2009 | Lu | G06F 1/1681 16/337 |
| 2012/0291247 | A1 * | 11/2012 | Wang | H01Q 1/243 29/281.1 |
| 2012/0304432 | A1 * | 12/2012 | Wang | G06F 1/1626 29/281.3 |
| 2012/0311837 | A1 * | 12/2012 | Wang | B23P 19/00 29/281.3 |
| 2014/0072381 | A1 * | 3/2014 | Taylor | B25B 1/103 409/226 |
| 2014/0109398 | A1 * | 4/2014 | Choi | H01L 24/78 29/700 |
| 2014/0123478 | A1 * | 5/2014 | Gylander | B25H 3/02 29/700 |
| 2014/0138265 | A1 * | 5/2014 | Bong | A45C 11/00 206/37 |
| 2015/0076306 | A1 * | 3/2015 | Yang | B23Q 3/18 248/346.06 |

FOREIGN PATENT DOCUMENTS

| | | | |
|---|---|---|---|
| DE | 3402315 A1 | * | 7/1984 |
| DE | 202012007652 | * | 9/2012 |
| DE | 202012007652 U1 | * | 9/2012 |
| EP | 2182155 | * | 3/2009 |
| EP | 2182155 A2 | * | 5/2010 |
| FR | 2685048 | * | 11/1991 |
| FR | 2685048 A1 | * | 12/1991 |
| GB | 2073843 | * | 4/1980 |
| GB | 2073843 A | * | 4/1980 |
| GB | 2073843 A | * | 8/1980 |
| GB | 2503536 A | * | 3/2013 |
| GB | 2503536 | * | 1/2014 |

OTHER PUBLICATIONS

SolidWorks Pinion Rack Mechanism from Solidworks Tutorial; Apr. 30, 2012.*
SolidWorks Tutorial; SolidWorks Pinion Rack Mechanism.*

* cited by examiner

PRESSING DEVICE

FIELD

The present disclosure relates to a pressing device, and more particularly, to a pressing device employed to press protection blocks to a workpiece.

BACKGROUND

Electronic devices may be damaged when dropped by accident, more particularly, electronic devices having four corners may be seriously damaged. Protection blocks may be attached to the corners of the electronic devices to protect the electronic devices. The protection blocks are attached to the corners of the electronic device by adhesion. A pressing device is employed to attach the protection blocks to the electronic device. The pressing device includes a knob, a linking assembly, a pressing assembly and a seat. An end of the linking assembly is pivotally connected to the seat, the pressing assembly is connected to an end of the linking assembly opposite to the seat and is located above the seat. When the knob is pressed under a predetermined force, the pressing assembly is moved downward with the linking assembly, thus pressing the plurality of protection blocks. Because the knob is connected to the linking assembly, and the linking assembly is pivotally connected to the pressing assembly, when the protection blocks exert a counter-force on the pressing assembly, gaps may be generated between the knob, the linking assembly, and the pressing assembly. Such that, the gaps may deform to absorb the force, so the pressing assembly may not properly or sufficiently contact the protection blocks to the corners of the electronic device, thereby a pressing quality of the pressing device is reduced.

BRIEF DESCRIPTION OF THE DRAWINGS

The components in the drawings are not necessarily drawn to scale, the emphasis instead placed to clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
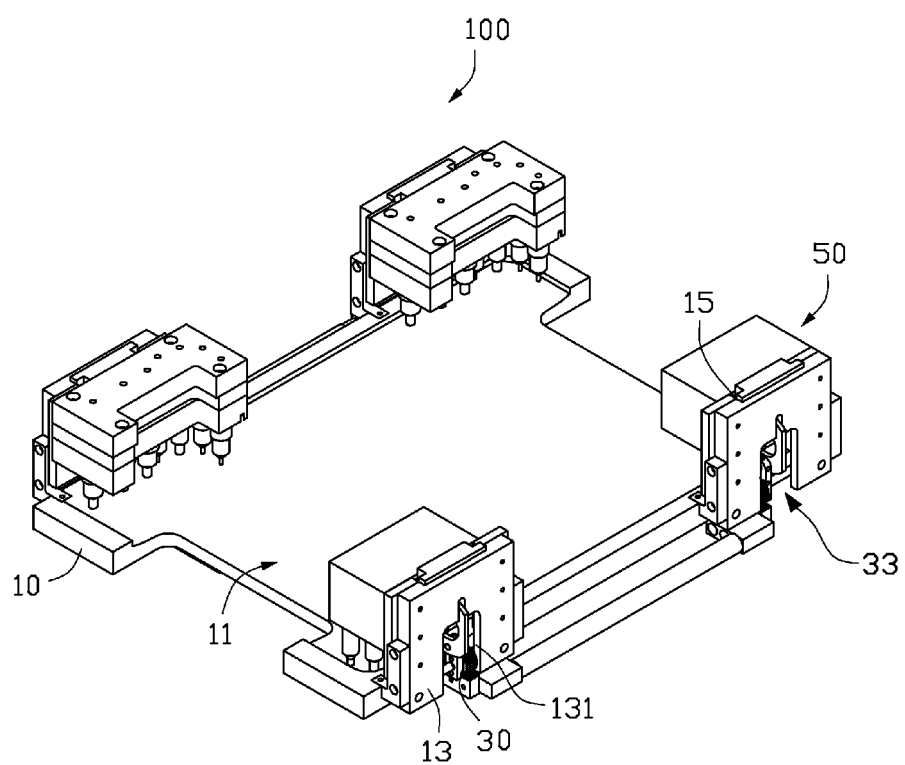
FIG. 1 is an isometric view of an embodiment of a pressing device, the pressing device includes a transmission assembly and four pressing assemblies.

FIG. 1 shows an embodiment of a pressing device 100 employed to press four protection blocks (not shown) to four corners of a workpiece (not shown). A bottom of each protection block is coated with a layer of adhesive. The pressing device 100 includes a seat 10, a transmission assembly 30, and four pressing assemblies 50. The transmission assembly 30 is movably assembled to the seat 10. The four pressing assemblies 50 are movably-assembled to four corners of the seat 10, and are connected to the transmission assembly 30. The transmission assembly 30 drives the four pressing assemblies 50 to respectively press the four protection blocks into four corners of the workpiece. The four corners of the workpiece are attached by the adhesive.

The seat 10 is substantially a rectangular plate, and defines a receiving groove 11 on a top surface thereof for receiving the workpiece. The seat 10 is equipped with four supporting members 13 at four corners thereof. The four supporting members 13 are divided into two groups, where each group includes two supporting members 13. The two supporting members 13 of each group are arranged symmetrically. The supporting member 13 is substantially a rectangular plate, and defines a sliding groove 15 at a side surface thereof facing another supporting member 13. The supporting member 13 further defines a receiving cutout 131 at a side thereof opposite to the sliding groove 15. The receiving cutout 131 is adjacent to the receiving groove 11.

Figure 2:
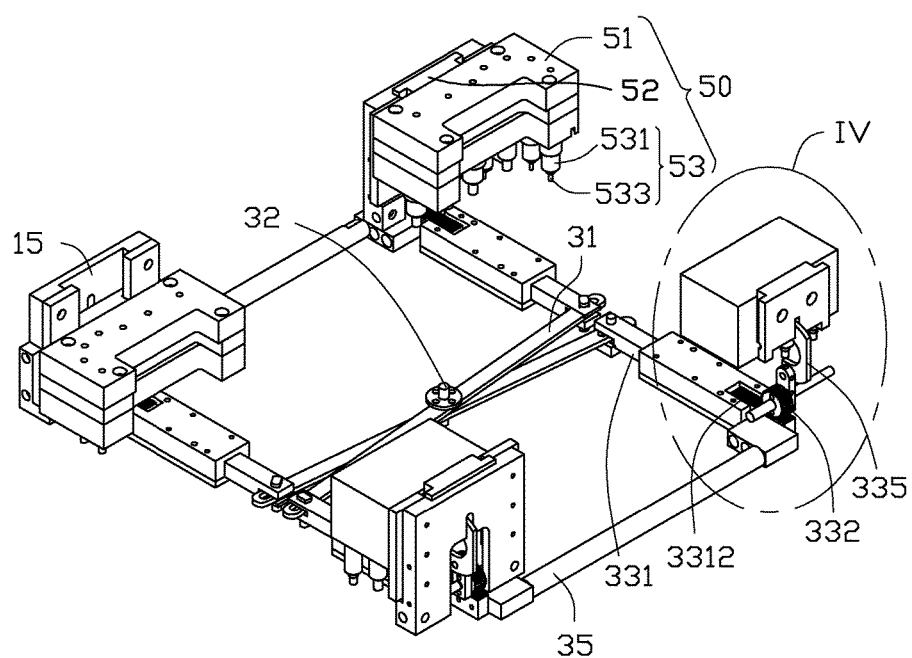
FIG. 2 is an isometric view of the pressing device of FIG. 1 with a part of the pressing device disassembled.

FIG. 2 shows the transmission assembly 30 movably-assembled to the seat 10. The transmission assembly 30 includes a pair of pivoting rods 31, a pivoting post 32, four transmission subassemblies 33, and a pair of pulling rods 35. The pivoting post 32 is assembled to a center region of a bottom of the receiving groove 11 of the seat 10. The pair of pivoting rods 31 is laminated or assembled together and is pivotally connected at a middle portion of each other. The middle portion of the pair of pivoting rods 31 is rotatably sleeved on the pivoting post 32, thereby connecting the pair of pivoting rods 31 to the pivoting post 32. In the embodiment, the pair of pivoting rods 31 intersects one another.

Figure 3:
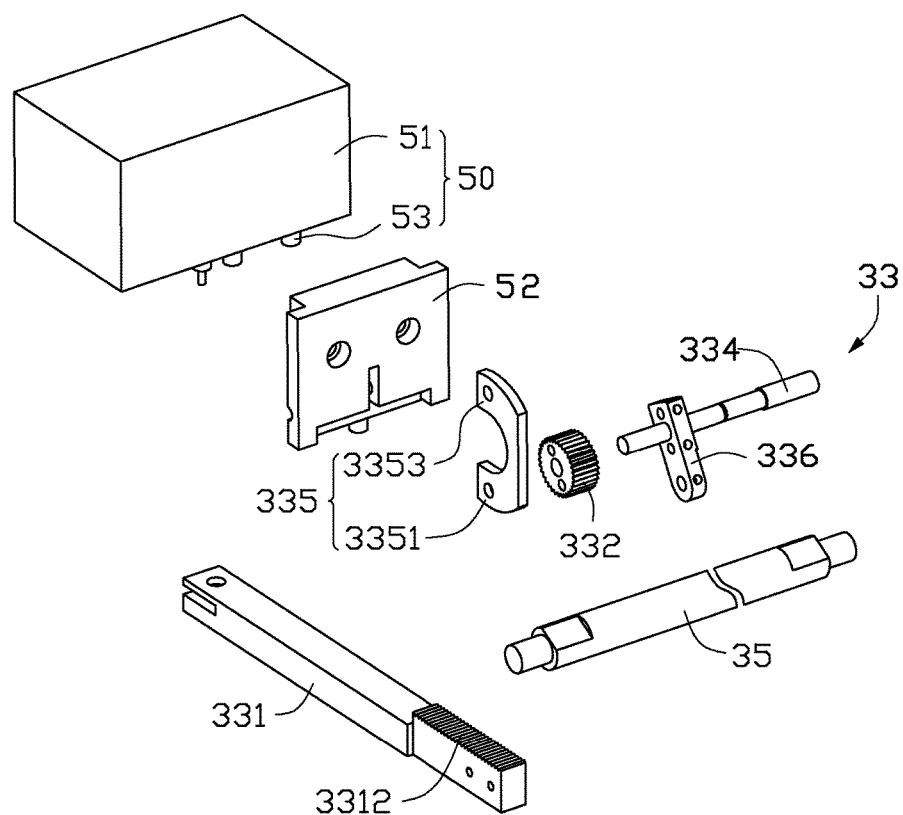
FIG. 3 is an isometric, exploded view of the transmission assembly and the pressing assembly of FIG. 2.
Figure 4:
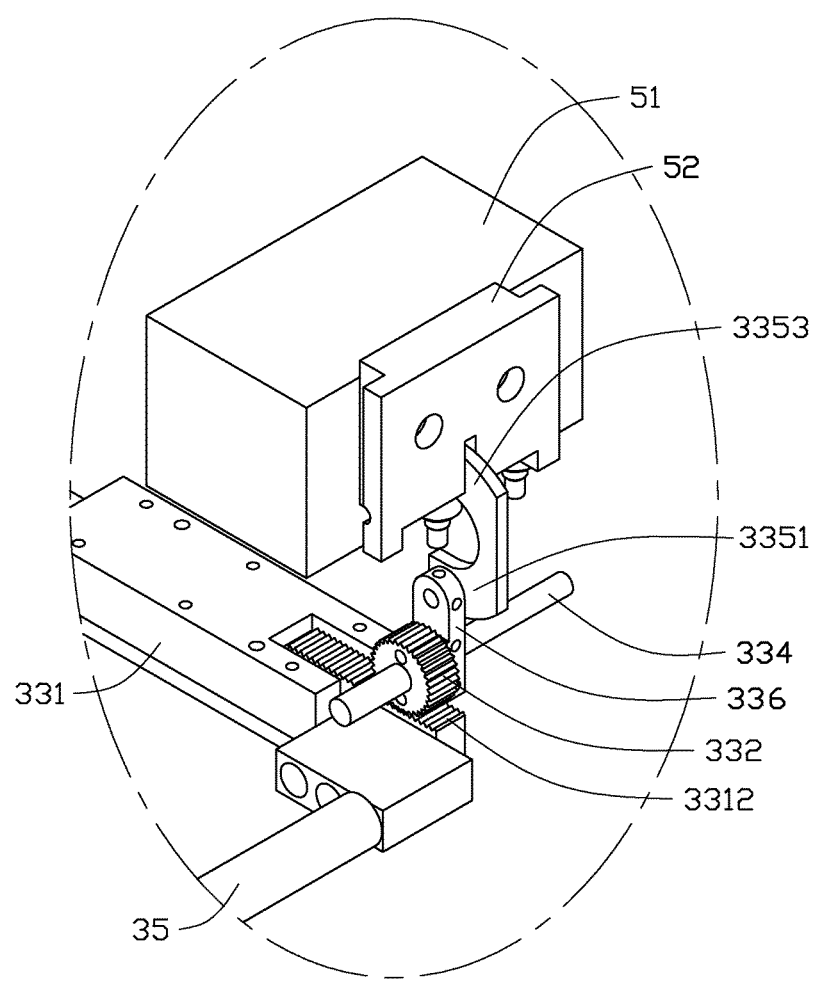
FIG. 4 is an enlarged view of circled portion IV of the pressing device of FIG. 2.

FIGS. 3 and 4 show an exploded view of the transmission subassembly 33. The transmission subassembly 33 includes a connecting rod 331, a gear 332, a rotation shaft 334, a connecting member 335, and a transmission member 336. The gear 332, the rotation shaft 334, and the transmission member 336 are received in the receiving cutout 131 of the supporting member 13. The connecting rod 331 is parallel to the bottom of the receiving groove 11. An end of the connecting rod 331 is rotatably connected to an end of one pivoting rod 31, the connecting rod 331 forms a plurality of racks 3312 on an end opposite to the pivoting rod 31. The racks 3312 protrudes out of the seat 10, the gear 332 is rotatably received in the receiving cutout 131 of the supporting member 13 and engages with the racks 3312. Opposite ends of the rotation shaft 334 are connected to the opposite sidewalls of the receiving cutout 131, respectively. The gear 332 is securely sleeved on the rotation shaft 334. The transmission member 336 is securely sleeved on the rotation shaft 334, and is positioned adjacent to the gear 332. The connecting member 335 is substantially C-shaped, and received in the receiving cutout 131. The connecting member 335 is connected to the transmission member 336, and includes a first connecting portion 3351 and a second connecting portion 3353 opposite to the first connecting portion 3351. The first connecting portion 3351 is connected to an end of the transmission member 336 away from the rotation shaft 334. The second connecting portion 3353 is connected to the pressing assembly 50.

The pair of pulling rods 35 is located at opposite sides of the seat 10. Opposite ends of each pulling rod 35 are connected to two connecting rods 331 which are opposite to each other. When the pair of pulling rods 35 are pulled away from each other, the connecting rod 331 moves away from the seat 10, the racks 3312 drive the gear 332 to rotate the transmission member 336, thereby moving the connecting member 335 of the transmission subassembly 33.

FIG. 1 shows that, the four pressing assemblies 50 are respectively assembled to the four supporting members 13, and each pressing assembly 50 is connected to one second connecting portion 3353 of one connecting member 335. The pressing assembly 50 includes a main body 51, a sliding body 52 assembled to a side of the main body 51, and a plurality of pressing members 53 assembled to a bottom of the main body 51. The sliding body 52 is assembled to a side surface of the main body 51 facing the supporting member 13, and is slidably received in the sliding groove 15 of the supporting member 13. The sliding body 52 is connected to the second connecting portion 3353 of the connecting member 335. In the embodiment, the plurality of pressing members 53 are assembled to a bottom surface of the main body 51 and are located above the seat 10. FIG. 2 shows that each pressing member 53 includes a buffering portion 531 and a pressing portion 533. The buffering portion 531 is connected to the bottom surface of the main body 51. The pressing portion 533 is assembled to the buffering portion 531 and located above the receiving groove 11.

When in assembly, the pair of pivoting rods 31 is stacked together, the pivoting post 32 extends through the pair of pivoting rods 31 and rotatably connects to the seat 10. An end of the connecting rod 33 is pivotally connected to an end of the pivoting rod 31. The rotation shaft 334 is connected to the opposite sidewalls of the receiving cutout 131. The gear 332 is rotatably sleeved on the rotation shaft 334 and is engaged with the racks 3312 of the connecting rod 331. The transmission member 336 is securely sleeved on the rotation shaft 334 and is connected to the first connecting portion 3351 of the connecting member 335. The sliding body 52 is assembled to a side of the main body 51 and is slidably received in the sliding groove 15 of the supporting member 13, and connected to the second connecting portion 3353 of the connecting member 335. The plurality of pressing member 53 is assembled to the bottom of the main body 51.

When in use, the workpiece is received in the receiving groove 11, the four protection blocks are located to four corners of the workpiece and are aligned with the four pressing assemblies 50. The pair of pulling rods 35 are pulled away from each other, the connecting rod 331 moves away from the seat 10, the racks 3312 drive the gear 332 to rotate the transmission member 336, thereby moving the connecting member 335. Then the connecting member 335 pulls the sliding body 52 to slide along the sliding groove 15, and the main body 51 is driven by the sliding body 52 to move toward the seat 10, thereby the pressing member 53 presses the protection blocks to the workpiece.

When being released, the pair of pulling rods 35 are moved toward each other, the connecting rods 331 move toward a center of the seat 10, the racks 3312 drive the gears 332 to rotate the transmission member 336, thereby moving the connecting member 335. Then the connecting member 335 pulls the sliding body 52 to slide along the sliding groove 15, and drive the main body 51 to move away from the seat 10, thereby releasing the protection blocks from the workpiece.

The pressing device 100 includes the transmission assembly 30 and the four pressing assemblies 50. The transmission assembly 30 includes the pair of pivoting rods 31, the four transmission subassemblies 33, and the pair of pulling rods 35. The pair of pivoting rods 31 are laminated together and are sleeved on the pivoting post 32, thereby connecting the pair of pivoting rods 31 to the seat 10. The four connecting rods 331 of the four transmission subassemblies 33 are pivotally connected to the pair of pivoting rods 31, respectively. The gear 332 is sleeved on the rotation shaft 334 and engages with the racks 3312. The connecting member 335 is securely sleeved on the rotation shaft 334 and is rotatably connected to the sliding body 52 of the pressing assembly 50. Because the gear 332 and the racks 3312 are gearing-engaged, the gaps among the connecting rod 331, the gear 332, the rotation shaft 334, and the transmission member 336 are thereby reduced. The pressing force exerted on the transmission assembly 30 is equal to a preset amount of force, and equally forces the four pressing assemblies 50, so that the protection blocks may be pressed to the workpiece uniformly and tightly, thereby enhancing a pressing quality.

In addition, the transmission assembly 30 is assembled to the bottom of the seat 10, and the four pressing assemblies 50 are assembled to the top of the seat 10, such that the pressing device 100 is more compact and volume-saving, and is suited for a relative small space. The manual pressing of the protection blocks is thereby omitted, and time is saved. Furthermore, because an equal amount of force is exerted on each protection block, the four protection blocks thus can be more evenly pressed to the workpiece, and is difficult to detach the protection blocks from the workpiece.

The number of the pressing assemblies 50 is not limited to four, but also may be one, two, three, and more than four, it may be changed according to the shape of the workpiece. The rotation shaft 334 may be rotatably connected to the seat 10 away from the connecting rod 331. The number of the pressing members 53 of each pressing assembly 50 may not limited to one, it may be more than one. When the transmission member 336 is directly connected to the sliding body 52, the connecting member 335 may be omitted.

Finally, while various embodiments have been described and illustrated, the disclosure is not to be construed as being limited thereto. Those skilled in the art can make various modifications to the embodiments without departing from the true spirit and scope of the disclosure as defined by the appended claims.

What is claimed is:

1. A pressing device employed to press a protection block to a workpiece, comprising:
   a seat;
   a transmission assembly located on a bottom surface of the seat, the transmission assembly comprising:
      a connecting rod pivotally connected to the bottom surface of the seat, wherein a plurality of racks are formed on an end of the connecting rod, the plurality of racks protruding out from the bottom surface of the seat;
      a rotation shaft assembled to a side of the seat orthogonal to the connecting rod;
      a gear fixed to the rotation shaft and engaging with the plurality of racks;
      a transmission member fixed to the rotation shaft; and
   at least one pressing assembly connected to the transmission member of the transmission assembly, wherein the at least one pressing assembly further comprises a plurality of pressing members facing towards a top surface of the seat, the plurality of pressing members are located above the seat, move toward and away from the top surface of the seat by movement of the connecting rod, the connecting rod drives the rotation shaft and the transmission member by rotation of the gear, the rotation shaft drives the at least one pressing assembly through the transmission member and moves the plurality of pressing members toward the top surface of the seat, thereby pressing the protection block on the workpiece.

2. The pressing device of claim 1, wherein the transmission assembly further comprises at least one pivoting rod and a pivoting post, the pivoting post is rotatably assembled to the bottom surface of the seat, the at least one pivoting rod is rotatably connected to the pivoting post, and an end of the at least one pivoting rod is rotatably connected to an end of the connecting rod.

3. The pressing device of claim 1, wherein the seat is equipped with at least one supporting member positioned at the side of the seat, the at least one supporting member having at least two sides spaced apart from each other, a sliding groove positioned at one side of the at least one supporting member, and a receiving cutout positioned at another side of the at least one supporting member opposite to the sliding groove, the receiving cutout is adjacent to the sliding groove, the at least one pressing assembly is partially and movably received in the sliding groove, wherein the gear, the rotation shaft, and the transmission member are received in the receiving cutout, and opposite ends of the rotation shaft are connected to opposite sidewalls of the receiving cutout.

4. The pressing device of claim 3, wherein the transmission assembly further comprises a C-shaped connecting member, the C-shaped connecting member comprises a first connecting portion and a second connecting portion spaced away from and opposite to the first connecting portion, the first connecting portion is connected to an end of the transmission member away from the rotation shaft, the second connecting portion is connected to the at least one pressing assembly.

5. The pressing device of claim 4, wherein the at least one pressing assembly comprises a main body and a sliding body, the sliding body assembled to a side of the main body, the sliding body slidably received in the sliding groove of the at least one supporting member, and connected to the second connecting portion of the connecting member.

6. The pressing device of claim 5, wherein the transmission assembly further comprises a pair of pulling rods connected to the connecting rod, each pulling rod is located at the side of the seat and drives the connecting rod to move.

7. The pressing device of claim 6, wherein the connecting rod, the gear, the rotation shaft, the connecting member and the transmission member form a transmission subassembly, the transmission assembly comprises four transmission subassemblies, the pressing device further comprises four pressing assemblies, and each of the four pressing assemblies is connected to each of the four transmission subassemblies.

8. The pressing device of claim 7, wherein the transmission assembly comprises a pair of pivoting rods, a pivoting post, and the pair of pulling rods, the pivoting post is assembled to a central region of the bottom surface of the seat, the pair of pivoting rods are laminated together and are pivotally connected to each other at middle portions thereof, the middle portions of the pair of pivoting rods are rotatably connected to the pivoting post, each transmission subassembly is connected to an end of each of the pair of the pivoting rods, the pair of pulling rods are located at opposite sides of the seat, and opposite ends of each of the pair of pulling rods are connected to two connecting rods of two transmission subassemblies, the two transmission subassemblies are opposite to each other.

9. The pressing device of claim 8, wherein the seat defines a receiving groove on the top surface thereof for receiving the workpiece, the four transmission subassemblies are arranged at four corners of the receiving groove.

10. A pressing device employed to press a protection block to a workpiece, comprising:

a seat equipped with at least one supporting member at a side of the seat, wherein the at least one supporting member defining a sliding groove thereon;
a transmission assembly comprising:
a connecting rod pivotally connected to a bottom surface of the seat, the connecting rod having a plurality of racks on an end thereof;
a gear securely assembled to the at least one supporting member and engaging with the plurality of racks, the plurality of racks protruding out of the seat from the bottom surface of the seat;
a rotation shaft;
a transmission member fixed to the gear; and
at least one pressing assembly connected to the transmission member of the transmission assembly and partially received in the sliding groove of the at least one supporting member, wherein the at least one pressing assembly further comprises a plurality of pressing members facing towards a top surface of the seat, the plurality of pressing members are located above the seat, the plurality of pressing members moving toward and away from the top surface of the seat by movement of the connecting rod, the connecting rod drives the rotation shaft and the transmission member by rotation of the gear, and the rotation shaft drives the at least one pressing assembly by the transmission member and moves the plurality of pressing members along the sliding groove toward or away from the top surface of the seat, thereby pressing the protection block on the workpiece or releasing the protection block from the workpiece.

11. The pressing device of claim 10, wherein the transmission assembly further comprises at least one pivoting rod and a pivoting post, the pivoting post is rotatably assembled to the bottom surface of the seat, the at least one pivoting rod is rotatably sleeved on the pivoting post, and an end of the pivoting rod is rotatably connected to an end of the connecting rod.

12. The pressing device of claim 10, wherein the at least one supporting member further defines a receiving cutout at a side thereof opposite to the sliding groove, the receiving cutout communicates with the sliding groove; the gear, and the transmission member are received in the receiving cutout.

13. The pressing device of claim 12, wherein the transmission assembly further comprises the rotation shaft and a C-shaped connecting member, opposite ends of the rotation shaft are connected to opposite sidewalls of the receiving cutout, the connecting member comprises a first connecting portion and a second connecting portion spaced away from and opposite to the first connecting portion, the first connecting portion is connected to an end of the transmission member away from the rotation shaft, the second connecting portion is connected to the at least one pressing assembly.

14. The pressing device of claim 13, wherein the at least one pressing assembly comprises a main body and a sliding body assembled to a side of the main body, the sliding body slidably received in the sliding groove of the at least one supporting member, and connected to the second connecting portion of the connecting member.

15. The pressing device of claim 14, wherein the transmission assembly further comprises a pulling rod connected to the connecting rod, the pulling rod is located at the side of the seat and drives the connecting rod to move.

16. The pressing device of claim 15, wherein the connecting rod, the gear, the rotation shaft, the connecting member and the transmission member form a transmission subassembly, the transmission assembly comprises four transmission subassemblies, the pressing device further comprises four pressing assemblies, and each of the four pressing assemblies is connected to each of the four transmission subassemblies.

17. The pressing device of claim 16, wherein the transmission assembly comprises a pair of pivoting rods, a pivoting post, and a pair of pulling rods, the pivoting post is assembled to a central region of the bottom surface of the seat, the pair of pivoting rods are laminated together and are pivotally connected to each other at middle portions thereof, the middle portions of the pair of pivoting rods are rotatably connected to the pivoting post, thereby connecting the pair of pivoting rods to the pivoting post, each transmission subassembly is connected to an end of each of the pivoting rods, the pair of pulling rods are located at opposite sides of the seat, and opposite ends of each of the pulling rods are connected to two connecting rods of two transmission subassemblies, the two transmission subassemblies are opposite to each other.

18. The pressing device of claim 17, wherein the seat defines a receiving groove on the top surface thereof for receiving the workpiece, the four transmission subassemblies are arranged at four corners of the receiving groove.

* * * * *